United States Patent [19]
Svensson et al.

[11] Patent Number: 5,236,480
[45] Date of Patent: Aug. 17, 1993

[54] AIR FILTER FOR WORKSTATIONS AND METHODS OF MAKING AND USING SUCH AIR FILTER

[75] Inventors: Anders Svensson; Sverker Hugert, both of Trosa, Sweden

[73] Assignee: Camfil AB, Trosa, Sweden

[21] Appl. No.: 924,441

[22] Filed: Aug. 4, 1992

Related U.S. Application Data

[63] Continuation-in-part of Ser. No. 800,988, Dec. 2, 1991, abandoned, which is a continuation of Ser. No. 461,421, Jan. 5, 1990, abandoned.

[30] Foreign Application Priority Data

Jan. 5, 1989 [EP] European Pat. Off. ........ 89850003.8

[51] Int. Cl.$^5$ ............................................. B01D 27/06
[52] U.S. Cl. ..................................... 55/385.2; 55/483; 55/485; 55/497; 55/521; 55/DIG. 5
[58] Field of Search ............... 55/385.2, 446, 497–500, 55/521, 97, 483, 485, 495, 496, DIG. 5

[56] References Cited

U.S. PATENT DOCUMENTS

| | | | |
|---|---|---|---|
| 2,038,071 | 4/1936 | Wilhelm | 55/388 X |
| 2,227,385 | 12/1940 | Benedict | 55/521 |
| 2,663,660 | 12/1953 | Layte | 55/497 X |
| 3,075,337 | 1/1963 | Andreae | 55/521 X |
| 3,111,489 | 11/1963 | Getzin | 55/495 X |
| 3,183,286 | 5/1965 | Harms | 55/497 X |
| 3,220,167 | 11/1965 | Van Der Ster et al. | 55/521 X |
| 3,413,782 | 12/1968 | Bartlett | 55/521 X |
| 3,498,032 | 3/1970 | Scott | 55/521 X |
| 3,710,562 | 1/1973 | McKenzie | 55/521 X |
| 3,802,168 | 4/1974 | Deckas | 55/497 X |
| 3,856,488 | 12/1974 | Kato et al. | 55/497 X |
| 4,008,060 | 2/1977 | Andreae | 55/446 |
| 4,135,900 | 1/1979 | Westlin et al. | 55/499 |
| 4,444,575 | 4/1984 | Miller et al. | 55/495 X |
| 4,610,706 | 9/1986 | Nesher | 55/497 |
| 4,619,675 | 10/1986 | Watanabe | 55/498 |
| 4,687,579 | 8/1987 | Bergman | 55/521 X |
| 4,799,944 | 1/1989 | Dixon et al. | 55/500 X |
| 5,015,377 | 5/1991 | Silvera | 55/497 X |
| 5,071,555 | 12/1991 | Enbom | 210/493.5 |

FOREIGN PATENT DOCUMENTS

| | | | |
|---|---|---|---|
| 2407329 | 9/1974 | Fed. Rep. of Germany | 55/521 |
| 2948249 | 10/1980 | Fed. Rep. of Germany | 55/521 |
| 2135456 | 12/1972 | France | 55/495 |
| 2490970 | 4/1982 | France | . |
| 6614283 | 5/1967 | Netherlands | 55/495 |
| 0676800 | 3/1991 | Switzerland | 55/497 |
| 1272564 | 5/1972 | United Kingdom | . |

OTHER PUBLICATIONS

Brochure: "Clean Room Filters (A Guide)", Camfil AB; p. 22.
Article: Swiss Contamination Control, "Laminar Airflow Uniformity Downstream of HEPA and ULPA Filters", J. Gustavsson (Camfil AB, 1990).

Primary Examiner—Robert Spitzer
Attorney, Agent, or Firm—Burns, Doane, Swecker & Mathis

[57] ABSTRACT

An air filter unit comprising a first sheet of filter material folded into a zig-zag configuration with a generally planar second sheet of fine mesh air penetrable material extending across apexes of the zig-zag fold on one or both sides of the filter. The second sheet includes peripheral portions which are folded up against the lateral edges of the first sheet to facilitate mounting of the filter unit within a frame.

9 Claims, 3 Drawing Sheets

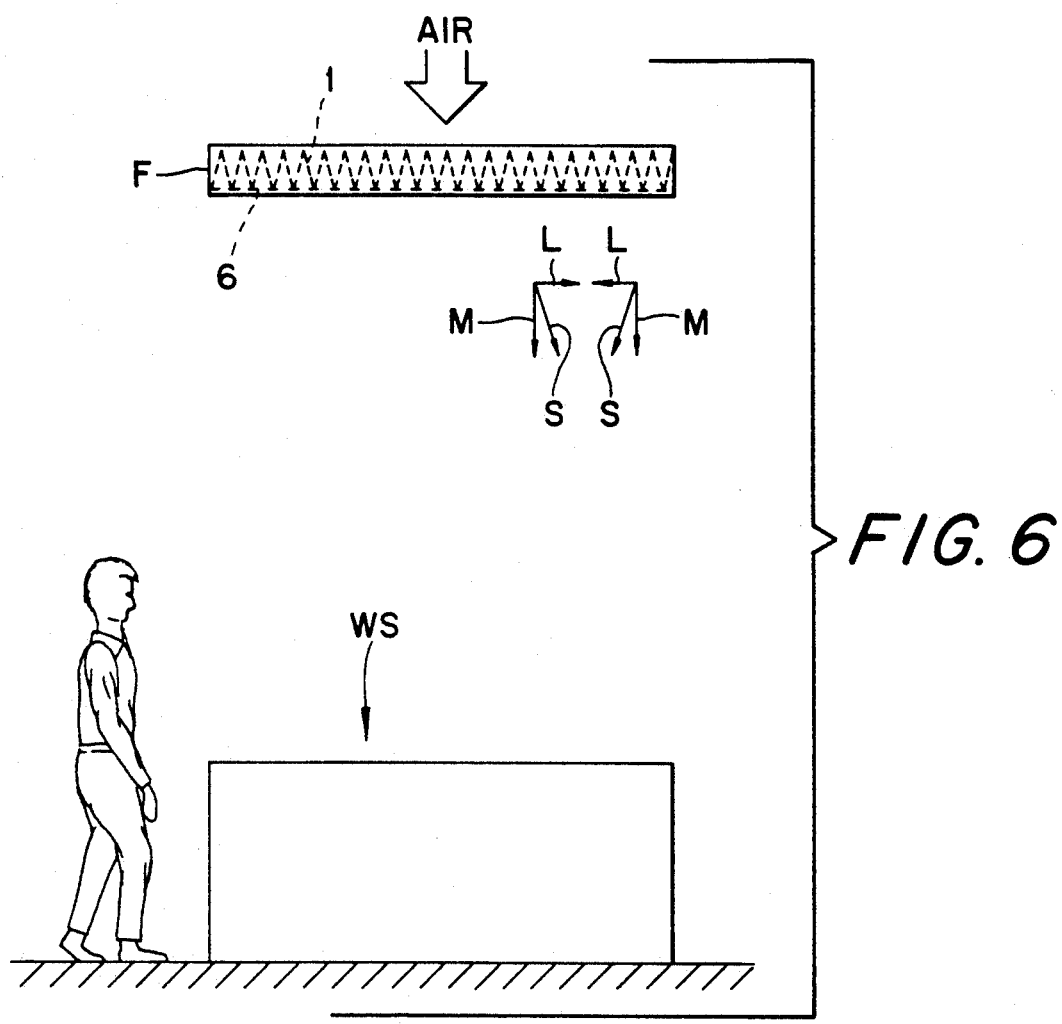
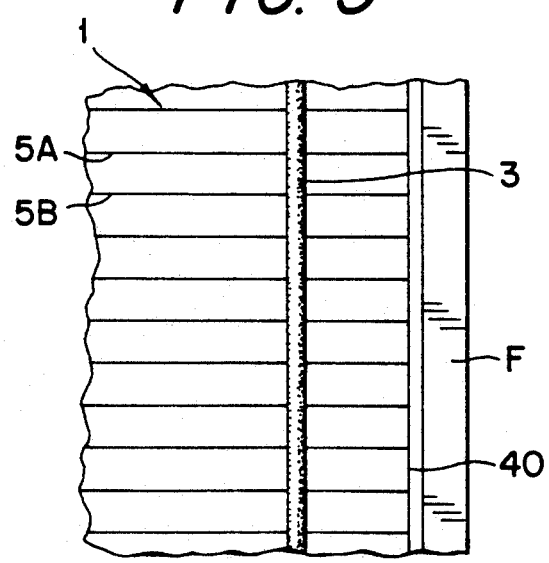
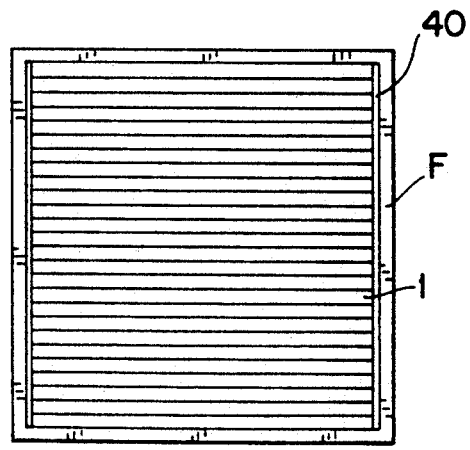

AIR FILTER FOR WORKSTATIONS AND METHODS OF MAKING AND USING SUCH AIR FILTER

RELATED INVENTION

This is a Continuation-in-Part of U.S. application Ser. No. 07/800,988 filed on Dec. 2, 1991 which is a Continuation of U.S. Ser. No. 07/461,421, filed on Jan. 5, 1990 both now abandoned. This invention is also related to that described in Enbom U.S. Pat. No. 5,071,555 issued Dec. 10, 1991.

BACKGROUND OF THE INVENTION

This invention is concerned with filters used to provide a very clean environment at work stations, e.g., at assembly stations for electronic circuits and the like.

In order to provide a very clean atmosphere at an assembly table a very clean flow of air is directed vertically downwards towards the table. In this way an air barrier is obtained preventing surrounding dust from reaching the workpieces. An advantage with this arrangement is that not even the person carrying out the work will contribute to the contamination of the workpiece. In general these filters are of the so-called "absolute" type in that they allow passage of virtually no contaminants. These filters are made by a rectangular zig-zag folding of a filter sheet structure with aluminum distance elements or spacers placed between the folds, the distance elements being in the form of zig-zag bent aluminum strips. As is apparent already from this brief description of the filters, they are very expensive, due to both the materials involved and the great amount of work necessary for fabrication.

Attempts have therefore been made to produce these filters without the expensive aluminum distance elements. It has for instance been suggested to use simple filters consisting of only zig-zag folded paper elements. Regretfully this has not turned out to be a very good solution. Filters produced in this way can cope with a necessary amount of air and they also provide a sufficiently clean air, but they do not give the required even flow of air leaving the filter. Instead, they result in a turbulent swirling flow of a type which totally destroys the clean environment at the work piece. Surrounding dust can easily be trapped in the swirls and be swept to the workpiece.

The above-described more expensive absolute filters including aluminum distance elements, however, produce an extremely even flow. The reason for this is that the air is very exactly directed through the filter by the aluminum strips which assuredly provide a greater number of parallel channels. The less expensive filters, whether they are of the absolute kind or not, do not however exhibit the same degree of precision in guiding the air which is streaming through, and this lack of precision results in flow variations.

In view of the above comments, it is an object of the invention to provide a filter that is less costly to fabricate, but is still usable in situations where a very even air flow is necessary from the filter for instance at work stations where a very great degree of air purity must be achieved.

SUMMARY OF PREFERRED EMBODIMENTS OF THE INVENTION

The above object is surprisingly enough achieved by an expedient which actually increases the turbulence downstream of the filter. This is done by placing a fabric or other easily air penetratable second sheet directly on the downstream side of the zig-zag configured filter sheet. In this way all flows leaving the absolute filter are broken up into multiple multidirectional small flows which have a main directional component in the main flow direction and lateral directional components oriented laterally of the main flow direction. The lateral components tend to counteract and neutralize one another whereby the resulting stream travels evenly in the main flow direction.

In a preferable embodiment of the invention the second sheet is bonded to the filter itself during fabrication, thereby also increasing the strength of the filter, which facilitates its mounting in frames and the like.

The second sheet preferably includes peripheral portions which are folded up against the lateral edges of the first sheet of filter material to facilitate the mounting of the filter unit (comprised of the two sheets) within a mounting frame. The present invention also relates to a method of assembling the filter apparatus, as well as a method of filtering the air being directed to a work station.

BRIEF DESCRIPTION OF THE DRAWING

The objects and advantages of the invention will become apparent from the following detailed description of a preferred embodiment thereof in connection with the accompanying drawings in which like numerals designate like elements, and in which:

FIG. 5 is a fragmentary top plan view of the filter apparatus depicted in FIG. 4;

FIG. 6 is a side elevational view of a workstation at which a filter apparatus according to the present invention has been placed, and depicts the air flow pattern; and FIG. 7 is a top plan view of a filter apparatus constructed in accordance with the present invention.

DETAILED DESCRIPTION OF A PREFERRED EMBODIMENT OF THE INVENTION

Figure 1:
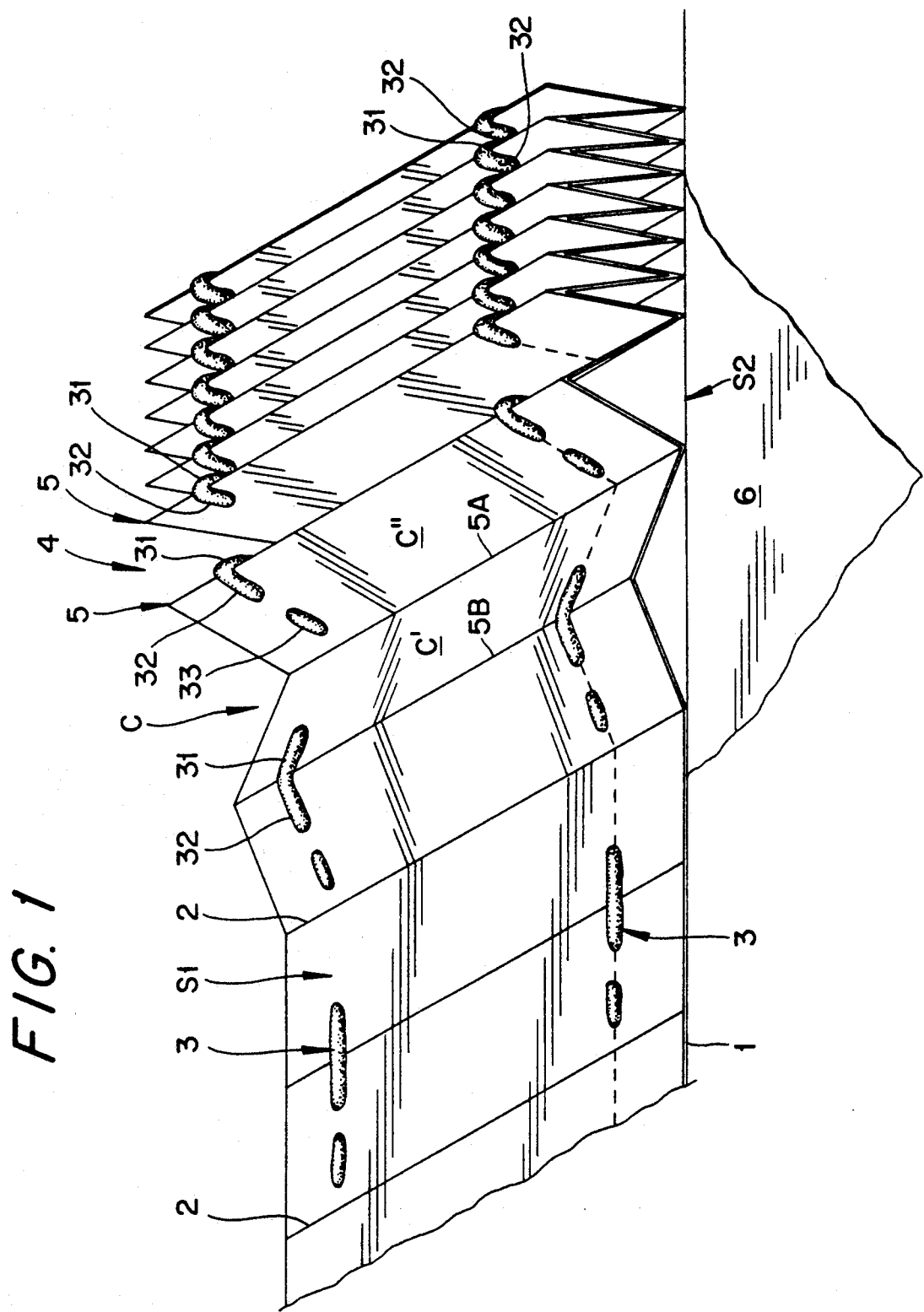
FIG. 1 is a top perspective view of a filter according to the invention in the process of being fan-folded.
Figure 2:
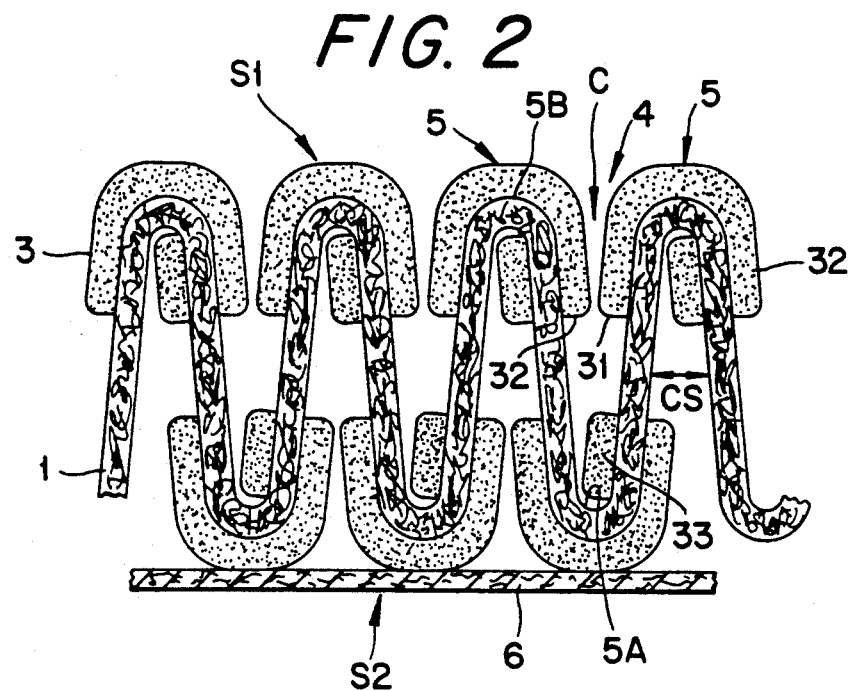
FIG. 2 is a cross-sectional view through the filter after fabrication.

In the drawing, a filter sheet material is designated by 1. When the filter is fabricated, folding lines 2 are preformed in the material by compressing the sheet material along parallel lines disposed transversely of a longitudinal length of the sheet. At the next station glue is administered to the upper and underside of the filter sheet material. As can be seen the glue is not administered in one continuous line but in short broken lines 3. The administering of glue 3 is such that when the filter sheet material in a consecutive fabrication step is folded into a zig-zag or fan configuration, a uniform wedge-like appearance is obtained comprised of open portions 4 and apex portions 5. As a result, each side S1 or S2 of the filter comprises spaced apart channels C, each channel formed by two opposing faces C' and C''. Each channel includes a wide end defined by the open portion 4 and a narrow end defined by an apex portion 5. An internal edge 5A of the apex portion 5 faces the open portion 4. Each open portion is disposed between the external edges 5B of two apex portions 5. Each channel C is of a diminishing cross-section CS in a direction from the wide end to the narrow end. This wedge-like appearance is obtained by allowing two opposite glue spots 31, 32 or glue lines to come in contact with one another at the open portion 4 of the channel, whereas in the vicinity of the narrow end of the channel a glue spot 33 is applied to only one of the two opposite faces of the channel. As a result, the channel C is caused to be wider at the open portion 4 than at the narrow end 5. The glue is administered in the same manner on the other side of the filter material. As is clear from FIG. 2, the apex portions S on each side of the sheet lie in a common plane.

It is also possible for the various glue lines or spots to be transversely staggered, i.e., they need not be longitudinally aligned. In each of the depicted embodiments, the glue lines are not continuous in the longitudinal direction, i.e., they are applied longitudinally discontinuously in a manner ensuring that each channel is of diminishing cross-section toward the narrow end of the channel.

In the shown embodiment the filter sheet material is folded while the glue is still at least partially melted so that the glue can adhere to itself, thereby gluing the filter folds together. In this manner the distance between the folds and thus the surface area of the filter can be governed by the speed with which the folded filter is removed. A fast transportation of the filter results in rather wide wedges whereas a slow transportation makes a more compact filter with a greater surface area, i.e., the total surface area per unit length of filter is greater. Alternatively, it would be possible to allow the glue to harden before the folding takes place and then remelt the glue at the folding station.

If desired, the glue need not be remelted, whereby the glue will not glue the filter folds together. In that case, glue need not be used; other materials could be deposited on the filter sheet material in order to produce the wedge-like appearance when the filter is folded.

It is preferred, however, that glue be used in order to bind the filter folds together. Furthermore, it can be used to glue an additional air penetratable sheet material 6 of planar construction to the underside of the filter. This material is forced-up against the apex portions on the bottom or the lower side of the filter which constitutes the outlet side of the filter when the filter is used. Since the glue lines pass over the external edges 5B of the apexes 5, no additional glue has to be administered to fasten the penetratable sheet material 6.

If additional strength is desired, an additional air penetratable sheet material can be applied on the upper (i.e., inlet) side of the filter in the same way but would have to be pressed down against the filter by an air cushion or something else. Not only is filter strength increased in this way, but large particles are prevented from entering the fine structure of the filter, thereby keeping the inlet side of the filter cleaner to provide a longer life span for the filter.

In practice, the air streams exiting the filter through the sheet 6 are broken up into numerous multidirectional small flows S each having a main directional component in the main flow direction M and lateral direction components L oriented laterally of the main flow direction (see FIG. 6). The lateral components tend to counteract and neutralize one another, whereby the resulting stream travels evenly in the main flow direction toward a personnel workstation WS.

The sheet 6 has a mesh which produces a pressure drop from 2 to 10 pascal at a flow velocity of 0.45 m/sec.

At later stages in the preparation of the filter, the folded sheet can be cut into suitable sizes.

Within the purview of the invention it is possible to allow the glue lines to be longitudinally discontinuous and transversely continuous and still obtain the desired wedge-like cross-section. This can be done by applying the glue lines in a lateral direction in such a way that the glue line at each apex of a wedge is located essentially lengthwise of the corresponding ridge so that the glue line or glue string is of single thickness, whereas at the opening of the wedge the glue lines will be of double thickness as in the above-described embodiments.

In the above description a few different ways of obtaining the wedge-like cross-section of the filter have been described. Of course, other patterns for the glue are also possible and the additionally applied sheet material could be applied by a separate gluing station.

The lines of glue need not be applied as a uniform thickness, but rather could be applied as a greater thickness at those areas wherein the glue will be disposed at the wide end of the channel. In that case, the glue need be applied on only one of the faces C', C'' adjacent the wide end, rather than on both such faces. In that case the glue could be applied in a longitudinally continuous manner, by varying the thickness at the appropriate places.

It should be noted that other patterns may also be used to obtain differently sized distance elements.

Depending on the machinery available for applying glue or other materials it is possible to apply the glue with a thickness corresponding to the angle of the wedge, for instance by means of nozzles of different sizes.

One way of incorporating such filters 1, 6 into a frame to form a filtering apparatus involves placing the filters 1, 6 in a frame and sealing the lateral edges of the filters 1, 6 in foam. The foam is applied manually as a fluid and allowed to cure. To prevent the fluid foam from contaminating the filtering portion of the surface of the filter sheet 1, this sealing of the filter in the frame is carried out one side at a time, with the side where foaming takes place being placed low, to prevent the foam from migrating up to the filtering portion. This is a simple operation but very time-consuming, because the foam must cure before the other lateral edge can be sealed. This part of the fabrication thus needs a comparatively large storing space for storing the filter units as the curing occurs, and involves a manual handling of the filter several times before it is ready. This is not only of great disadvantage from the standpoint of time and space expenditures, but since the filters as fabricated are very sensitive and prone to breakage they are easily damaged during the handling. This is easily understood if one considers the general dimensions of these filters. For example, they may have the size of ten square feet or more with a thickness of only an inch or two. Typically this can easily lead to an unacceptable amount of discarded damaged filters. In other words, the filters are not only being handled many times but must at all times be handled extremely carefully.

Figure 3:
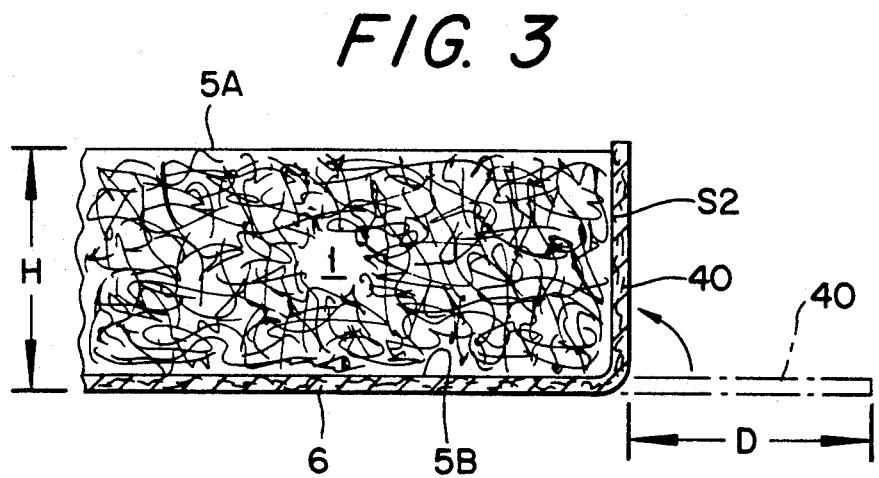
FIG. 3 is a fragmentary cross-sectional view through a filter unit according to the present invention, depicting the manner in which the peripheral portions of a second sheet are folded upwardly against the lateral edges of a first filter sheet.
Figure 4:
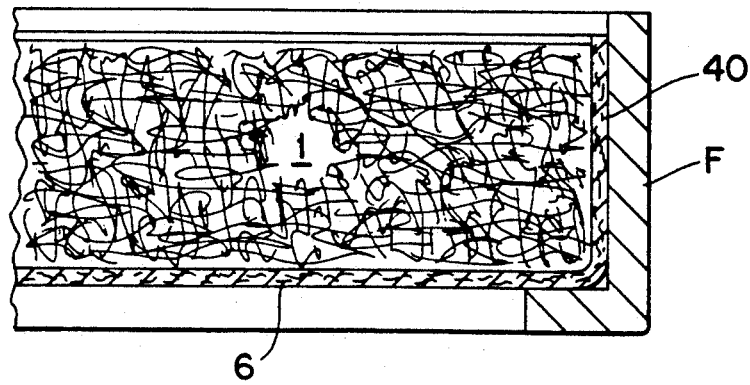
FIG. 4 is a view similar to FIG. 3 after the filter unit has been mounted in a frame.

In accordance with a further aspect of the invention, this time-consuming framing and sealing process is reduced to a minimum, and the rigidness of the filter is increased considerably. In that regard, the air permeable sheet 6 is sized so that lateral portions 40 thereof extend laterally beyond each of the lateral edges S1, S2 of the filter sheet 1 by a distance D (see the broken lines in FIG. 3) at least as great as the height H of the upstanding lateral edge of the zig-zag filter sheet 1. Then, the projecting lateral portions 40 of the air permeable sheet 6 are folded up to cover the upstanding lateral edges of the filter sheet as shown in solid lines in FIG. 3. By attaching the folded portion 40 of the permeable sheet 6 to the lateral edges, e.g., by glue, the lateral edges of the filter sheet 1 become covered and protected. Hence, the unit formed by sheets 1, 6 can be secured within a frame F (see FIGS. 4, 5) by attaching the sheet 6 to the frame F, e.g., by glue, disposed between the frame F and the outer surfaces of the folded portions. There is no need to worry about the attaching material (glue) from migrating to the filtering portion of the filtering sheet 1, since the folded portions 40 of the sheet 6 effectively cover the lateral edges of the filter sheet 1. Hence, both lateral sides of the filter unit 1, 6 can be glued simultaneously; there is no need to wait for glue on one side to cure before gluing the other side. Furthermore, the resultant seal is less susceptible to flaws than the prior method of applying a foam directly to the lateral edges of the sheet 1. Also, very little glue needs to be used to secure the filter sheet 1, since the filter sheet 1 is already sealed by the folded portion 40 of sheet 6.

It will be appreciated that it is possible to secure the edges of sheet 1 to the folded portions 40 other than by glue, e.g., by fusing or welding.

As a result of this novel attaching method, framing time is reduced from about 40 minutes to 2 minutes for each filter, and the filter apparatus is adapted to being assembled on an assembly line without the need to store the filters during a curing period, as in the previous method.

In addition, the filter unit 1, 6 becomes more rigid due to the folding-up of the portions 40 of sheet 6, thereby rendering the filter unit 1, 6 less susceptible to damage. Thus, the filter sheet 1 and the permeable sheet 6 (and perhaps even the frame F) could all be formed of the same material, thereby making it easier to destroy or reprocess the filter apparatus after use.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A filter apparatus for providing a clean environment at a workstation, comprising a frame and a filter unit mounted in said frame, said filter unit including a first sheet of filter material folded in a zig-zag configuration to form alternating open portions and apex portions at air inlet and outlet sides of said folded sheet material, said apex portions at said air outlet side of said folded first sheet lying substantially in a common plane, and a second sheet of air permeable fine mesh material, said second sheet including a planar section extending across said apex portions of said air outlet side of said folded sheet material for establishing an even flow of air exiting the filter apparatus, wherein said second sheet includes peripheral portions folded against the lateral edges of said first sheet.

2. A filter apparatus according to claim 1, wherein said filter unit further includes a third sheet of air penetrable fine mesh material extending across said apex portions on said air inlet side of said filter.

3. A filter according to claim 1, wherein said second sheet is attached to said air outlet side of said zig-zag folded first sheet by glue which also holds together the folds of the zig-zag folded first sheet.

4. A filter apparatus according to claim 3, wherein said glue holding said second sheet to said zig-zag folded first sheet is disposed on external edges of said apexes of said air outlet side of said filter.

5. A filter apparatus according to claim 1, wherein said peripheral portions of said second sheet bonded to said lateral edges of said first sheet.

6. A filter apparatus according to claim 5, wherein said second sheet is bonded to said frame.

7. A work station at which a clean environment is required, comprising a personnel station, and air filtering means for providing a clean air flow to said personnel station, said air filtering means comprising a frame and a filter unit mounted in said frame, said filter unit including a first sheet of filter material folded in a zig-zag configuration to form alternating open portions and apex portions at air inlet and outlet sides of said folded first sheet, said apex portions at said air outlet side of said folded first sheet lying substantially in a common plane, and a second sheet of air permeable fine mesh material, said second sheet including a planar section extending across said air outlet side of said folded first sheet material for establishing an even flow of air exiting the filter, said air filtering means being oriented such that air exiting the filter is directed directly toward said personnel station, wherein said second sheet includes peripheral portions folded against lateral edges of said first sheet.

8. A method of forming a filter comprising the steps of:
  A) folding a first sheet of filter material in a zig-zag manner with the fold lines thereof extending from one lateral edge of said sheet to the other lateral edge,
  B) bonding the folds of said first sheet together to retain said first sheet in a zig-zag folded state,
  C) bonding a substantially planar second sheet of air permeable material against the fold lines on one side of said first sheet, said second sheet sized to provide laterally projecting portions which project laterally beyond said lateral edges of said first sheet by a distance at least substantially equal to a height of said lateral edges,
  D) folding said laterally projecting portions against said lateral edges of said first sheet to cover said lateral edges, and bonding said folded laterally projecting portions to said lateral edges,
  E) placing a unit comprised of said first and second sheets into a substantially planar frame, and bonding to said frame a surface of each of said projecting portions which faces away from said first sheet, and
  F) bonding said unit to said frame.

9. A method according to claim 8, wherein each of said bonding steps B, C and E comprises the application of glue.

* * * * *